United States Patent [19]
Mathews et al.

[11] 3,764,521
[45] Oct. 9, 1973

[54] PROCESS FOR THE UPGRADING OF HEAVY CRACKING RESIDUES BY HYDROGENATION

[75] Inventors: Glenn William Mathews, Lake Jackson; Billy Duane Head, Angleton; Milton Silas Wing, Lake Jackson, all of Tex.

[73] Assignee: The Dow Chemical Company, Midland, Mich.

[22] Filed: Oct. 18, 1971

[21] Appl. No.: 190,280

[52] U.S. Cl.............. 208/143, 208/255, 260/674 H
[51] Int. Cl............................................. C10g 23/02
[58] Field of Search........................... 208/143, 255; 260/674 H

[56] References Cited
UNITED STATES PATENTS

| | | | |
|---|---|---|---|
| 3,493,492 | 2/1970 | Sze | 208/143 |
| 3,221,078 | 11/1965 | Keith et al. | 208/143 |
| 3,309,310 | 3/1967 | Mickel | 208/255 |
| 3,451,922 | 6/1969 | Parker | 208/143 |
| 3,470,085 | 9/1969 | Parker | 208/143 |
| 3,537,981 | 11/1970 | Parker | 208/143 |

*Primary Examiner*—Curtis R. Davis
*Attorney*—William M. Yates et al.

[57] ABSTRACT

Process for the hydrogenation of heavy hydrocarbon residues boiling in the range from about 220°F to about 650°F and containing up to 10 percent by weight of tars and gums wherein the hydrocarbon is mixed with hydrogen, passed through a hydrogenation zone under a pressure of 100–1,000 psig, a temperature of 100°C to 200°C, and in the presence of a supported platinum or palladium catalyst and cooled.

The hydrogenated product is then distilled to produce a high grade gasoline blend stock as the overhead and the bottoms are useful as a fuel oil.

12 Claims, No Drawings

PROCESS FOR THE UPGRADING OF HEAVY CRACKING RESIDUES BY HYDROGENATION

BACKGROUND OF THE INVENTION

This invention relates to a process for the upgrading of heavy cracking residues by catalytic hydrogenation.

It is known from U.S. Pat. No. 2,757,128 that distilled high boiling petroleum fractions from catalytic cracking units can be hydrogenated to remove sulfur compounds, and to saturate the olefins and aromatics by treating the petroleum fractions to a fluidized hydrogenation catalyst at a temperature of 500° to 550°F and a pressure of 100–500 psig.

It is also known from U.S. Pat. No. 3,493,492 that pyrolysis gasoline or dripolene can be hydrogenated in a process wherein a portion of the hydro-treated effluent is recycled back to heat the feed material and wherein the hydrogenation temperature is kept in the range from about 120°F and about 400°F.

The above patents and the other known prior art suggest the hydrogenation of hydrocarbon cuts but they suffer from the economic disadvantage that the crude hydrocarbon streams must be first distilled in order to remove the tars and gums which quickly foul the catalysts used.

SUMMARY OF THE INVENTION

It has been discovered that cracking residues with high gum content from the cracking of hydrocarbons can be directly hydrogenated over a catalyst without prior distillation to produce a gasoline blend stock and a fuel oil under specific process steps and conditions which result in long catalyst life.

Thus, the present invention relates to a process for the hydrogenation of heavy hydrocarbon feeds boiling in the range from about 220°F to about 650°F and containing up to 10 percent by weight of tars and gums to produce a mixture of a gasoline blend stock and a fuel oil wherein the steps comprise, 1. mixing hydrogen with said hydrocarbon feed in a mole ratio of hydrogen to olefinic content in the range from 1:1 to 10:1,
2. passing said mixture through a hydrogenation zone under a pressure in the range from 100 to 1,000 psig, at a temperature in the range from 100°C to 200°C at a space velocity in the range from 0.5 to 10.0 liquid hourly space velocity in the presence of a packed catalytic material consisting essentially of 0.2 to 5 percent by weight of palladium or platinum supported on a porous carrier material, and
3. cooling the reactor effluent to produce a mixture of a gasoline blend stock and a fuel oil.

It is preferred to operate the above process wherein in the mixing step, the mole ratio of hydrogen to olefinic content in the hydrocarbon feed is in the range from 2:1 to 4:1, and wherein in the hydrogenation zone the pressure is in the range from 400 to 600 psig, the space velocity is in the range from 1.0 to 2.0, the temperature is in the range from 120°C to 150°C, the metallic content of the catalyst is in the range from 0.5 to 2.0 weight percent, and the carrier material consists of alumina spheres having a size range from about one-sixteenth inch diameter to about three-sixteenths inch diameter.

The resulting cooled reactor effluent can then be distilled to a 400°F end point to produce a high quality gasoline blend stock as the overhead condensate and a stabilized and deodorized fuel oil as the bottoms from the distillation step.

DETAILED DESCRIPTION:

The process of this invention is applicable to the by-products of the pyrolysis of liquified petroleum gas (L.P.G.), naphtha, gas oil and the like. These waste streams or bottoms contain as major constituents, styrene, dicyclopentadiene, naphthalene, anthracene, tars and gums.

As indicated previously, these bottoms are usually distilled, hydro-treated, and the product distilled to recover the valuable products contained therein.

It has been found that the initial distillation step can be eliminated and long catalyst life obtained during the hydrogenation of these bottoms if the hydrocarbon feed i.e. the bottoms are mixed with hydrogen gas at a ratio in the range from 1:1 to 10:1 moles of hydrogen per mole of olefin content in the hydrocarbon feed. A preferred ratio is in the range from 2:1 to 4:1.

Pure hydrogen gas can be used or an impure recycle stream of hydrogen can be used containing other gases such as nitrogen, methane, carbon dioxide and the like as long as the proper ratio of hydrogen to hydrocarbon is maintained in the mixture.

The pressure used during the hydrogenation step can vary from 100 to 1,000 pounds per square inch gage (psig) with a range from 400 to 600 psig being preferred.

The temperature of the hydrogenation zone is generally relatively low i.e. in the range from 100°C to 200°C with a range from 120°C to 150°C being preferred.

The mixture of hydrogen and hydrocarbon is passed upwardly through a catalyst bed in the hydrogenation zone at a liquid hourly space velocity (milliliters per hour of feed per milliliters catalyst volume) in the range from 0.5 to 10.0 with the preferred range being 1.0 to 2.0.

It is preferred to operate the process using a up-flow of the hydrogen-hydrocarbon mixture through the packed catalyst bed since this allows the process to operate at a lower temperature as compared to a down-flow process. Consequently, the catalyst will last from three to five times longer when using the up-flow process before catalyst deactivation and fouling occurs.

The catalyst used in this process can be prepared by depositing palladium or platinum salts on an amorphous refractory inorganic oxide such as alumina, titania, zirconia, chromina, magnesia, thoria, boria, silica-alumina, silica-magnesia and the like.

The catalyst support or carrier used may be in any of the usual shapes such as spheres, pills, extrudates, granules, and the like and should have a surface area in the range from 25–500 square meters per gram and preferably in the range from 100 to 200 square meters per gram.

The preferred catalyst used in the process of this invention was prepared by depositing palladium or platinum salts on activated alumina spheres having a size range from about one-sixteenth inch diameter to about three-sixteenths inch diameter.

A preferred catalyst can be prepared by impregnating commercially available activated alumina spheres with an aqueous solution of palladium chloride or platinum chloride. The metal salt is then precipitated onto the spheres by heating to a temperature of 400°C for 2 hours.

The finished catalyst have a metallic content in the range from 0.2 to 5 percent by weight with the preferred range being from 0.5 to 2 percent by weight.

After the hydrogen-hydrocarbon mixture passes through the packed catalyst bed, the effluent is cooled in a water condenser or similar apparatus to a temperature in the range from 25° to 30°C whereby a product is condensed which is a mixture of saturated hydrocarbons.

This mixture or condensate is then distilled to a 400°F end point to produce a high quality gasoline blend stock i.e. high octane and low gum content. The bottoms from the distillation step are separately recovered to produce a stabilized and deodorized fuel oil.

Thus, the present process provides an efficient and economical process for the conversion of a waste hydrocarbon feed stock into useful products such as a gasoline blend stock and fuel oil.

The process is further illustrated by the following example.

A feed stream (260 milliliters/hour) having the composition set forth in Table I was mixed with about 100 liters per hour of pure hydrogen gas and passed upwardly through a fixed bed reactor containing 260 milliliters of 0.5 percent by weight palladium on a one-eigth inch spherical alumina support.

The reactor was maintained at a temperature of 120°C–150°C and a pressure of 600 psig. The reactor effluent was cooled to ambient temperature and separated from the unreacted hydrogen gas. A stabilized product having the composition shown in Table I was removed continuously from the product receiver. The system operated continuously 24 hours a day for 3 months before regeneration of the catalyst was necessary.

A similar run was conducted wherein the same hydrogen-hydrocarbon mixture was passed downwardly through the same catalyst under the same conditions. The catalyst gave substantially the same results as set forth in Tables I and II except that it operated only 30 days before regeneration was necessary.

The hydrogenated product shown in Table I was distilled at a temperature of 230°F to 248°F under a pressure of 50 mm of Hg to produce a gasoline blend stock having the properties shown in Table II. The bottoms from this distillation were useful directly as a fuel oil since they were stable and odor free.

TABLE I

Analysis of Feed and Product (% by weight)

| Components by Gas Chromatographic Analysis | Feed | Hydrogenated Product |
|---|---|---|
| Lighter than ethyl benzene | 2.70 | 3.00 |
| Ethyl benzene | 1.64 | 13.80 |
| p-Xylene | 0.67 | 0.95 |
| m-Xylene | 1.22 | 1.64 |
| o-Xylene | 0.72 | 0.69 |
| Styrene | 13.70 | 0 |
| Dicyclopentadiene (DCPD) | 20.20 | 0.61 |
| Dihydro DCPD | 0 | 10.90 |
| Tetrahydro DCPD | 0 | 8.60 |
| Indane | 1.00 | 5.23 |
| Indene | 6.01 | 0 |
| Naphthalene | 9.52 | 9.90 |
| Other unknown aromatics, parafins and napthenes | 13.82 | 17.18 |
| High boiling compounds (alkyl naphthalene, phenonthrene, etc.) | 28.80 | 27.50 |
| | 100.00 | 100.00 |

TABLE II

Properties of Gasoline Blend Stock

| | |
|---|---|
| Distillation yield | 62% by weight |
| Existant gum, ASTM test D-381 | 1.6 milligram per 100 milliliters |
| Potential gum, ASTM Test D-525 | 4.5 milligram per 100 milliliters |
| Induction Time, ASTM Test D-525 | 300 minutes |
| Research Octane No. (clear) | 95 |

We claim:

1. A process for the hydrogenation of heavy hydrocarbon feeds boiling in the range from about 220°F to about 650°F and containing up to 10 percent by weight of tars and gums to produce a mixture of a gasoline blend stock and a fuel oil which comprises
    A. mixing hydrogen with said hydrocarbon feed in a mole ratio of hydrogen to olefinic content of said feed in the range from 1:1 to 10:1,
    B. passing said mixture through a hydrogenation zone under a pressure in therange from 100 to 1,000 psig, at a temperature in the range from 100° to 200°C at a space velocity in the range from 0.5 to 10.0 liquid hourly space velocity in the presence of a packed catalytic material consisting essentially of 0.2 to 5 percent by weight of palladium or platinum on a porous carrier material, and
    C. cooling the reactor effluent to produce a mixture of a gasoline blend stock and a fuel oil.

2. A process as defined in claim 1 wherein in the mixing step the mole ratio of hydrogen to olefinic content of the hydrocarbon feed is in the range from 2:1 to 4:1, and wherein in the hydrogenation zone the pressure is in the range from 400 to 600 psig, the space velocity is in the range from 1.0 to 2.0, the temperature is in the range from 120°C to 150°C, the metallic content of the catalyst is in the range from 0.5 to 2.0 weight percent, and the porous carrier material consists of alumina spheres having a size range from about one-sixteenth inch diameter to about three-sixteenths inch diameter.

3. A process as defined in claim 2 wherein the mixture is passed upwardly through the hydrogenation zone.

4. A process as defined in claim 2 wherein the mixture is passed downwardly through the hydrogenation zone.

5. A process for the hydrogenation of heavy hydrocarbon feeds boiling in the range from about 220°F to about 650°F and containing up to 10 percent by weight of tars and gums to produce a high quality gasoline blend stock which comprises
    A. mixing hydrogen with said hydrocarbon feed in a mole ratio of hydrogen to olefinic content of said feed in the range from 1:1 to 10:1,
    B. passing said mixture through a hydrogenation zone under a pressure in the range from 100 to 1,000 psig, at a temperature in the range from 100° to 200°C at a space velocity in the range from 0.5 to 10.0 liquid hourly space velocity in the presence of a packed catalytic material consisting essentially of 0.2 to 5 percent by weight of palladium or platinum on alumina spheres,
    C. cooling the reactor effluent to produce a mixture of a gasoline blend stock and a fuel oil, and
    D. distilling said condensate to a 400°F end point to produce a high quality gasoline blend stock as the overhead condensate.

6. A process as defined in claim 5 wherein in the mixing step the mole ratio of hydrogen to olefinic content of the hydrocarbon feed is in the range from 2:1 to 4:1, and wherein in the hydrogenation zone the pressure is in the range from 400 to 600 psig, the space velocity is in the range from 1.0 to 2.0, the temperature is in the range from 120° to 150°C, and the metallic content of the catalyst is in the range from 0.5 to 2.0 weight percent.

7. A process as defined in claim 6 wherein the mixture is passed upwardly through the hydrogenation zone.

8. A process as defined in claim 6 wherein the mixture is passed downwardly through the hydrogenation zone.

9. A process for the hydrogenation heavy hydrocarbon feeds boiling in the range from about 220° to about 650°F and containing up to 10 percent by weight of tars and gums to produce a fuel oil which comprises
A. mixing hydrogen with said hydrocarbon feed in a mole ratio of hydrogen to olefinic content of said feed in the range from 1:1 to 10:1,
B. passing said mixture upwardly through a hydrogenation zone under a pressure in the range from 100 to 1,000 psig, at a temperature in the range from 100° to 200°C at a space velocity in the range from 0.5 to 10.0 liquid hourly space velocity in the presence of a packed catalytic material consisting essentially of 0.2 to 5 percent by weight of palladium or platinum on alumina spheres,
C. cooling the reactor effluent to produce a mixture of a gasoline blend stock and a fuel oil, and
D. distilling said condensate to a 400°F end point to produce a fuel-oil as the bottoms from the distillation.

10. A process as defined in claim 9 wherein in the mixing step the mole ratio of hydrogen to olefinic content of the hydrocarbon feed is in the range from 2:1 to 4:1, and wherein in the hydrogenation zone the pressure is in the range from 400 to 600 psig, the space velocity is in the range from 1.0 to 2.0, the temperature is in the range from 120° to 150°C, and the metallic content of the catalyst is in the range from 0.5 to 2.0 weight percent.

11. A process as defined in claim 10 wherein the mixture is passed upwardly through the hydrogenation zone.

12. A process as defined in claim 10 wherein the mixture is passed downwardly through the hydrogenation zone.

* * * * *